Figure 1:
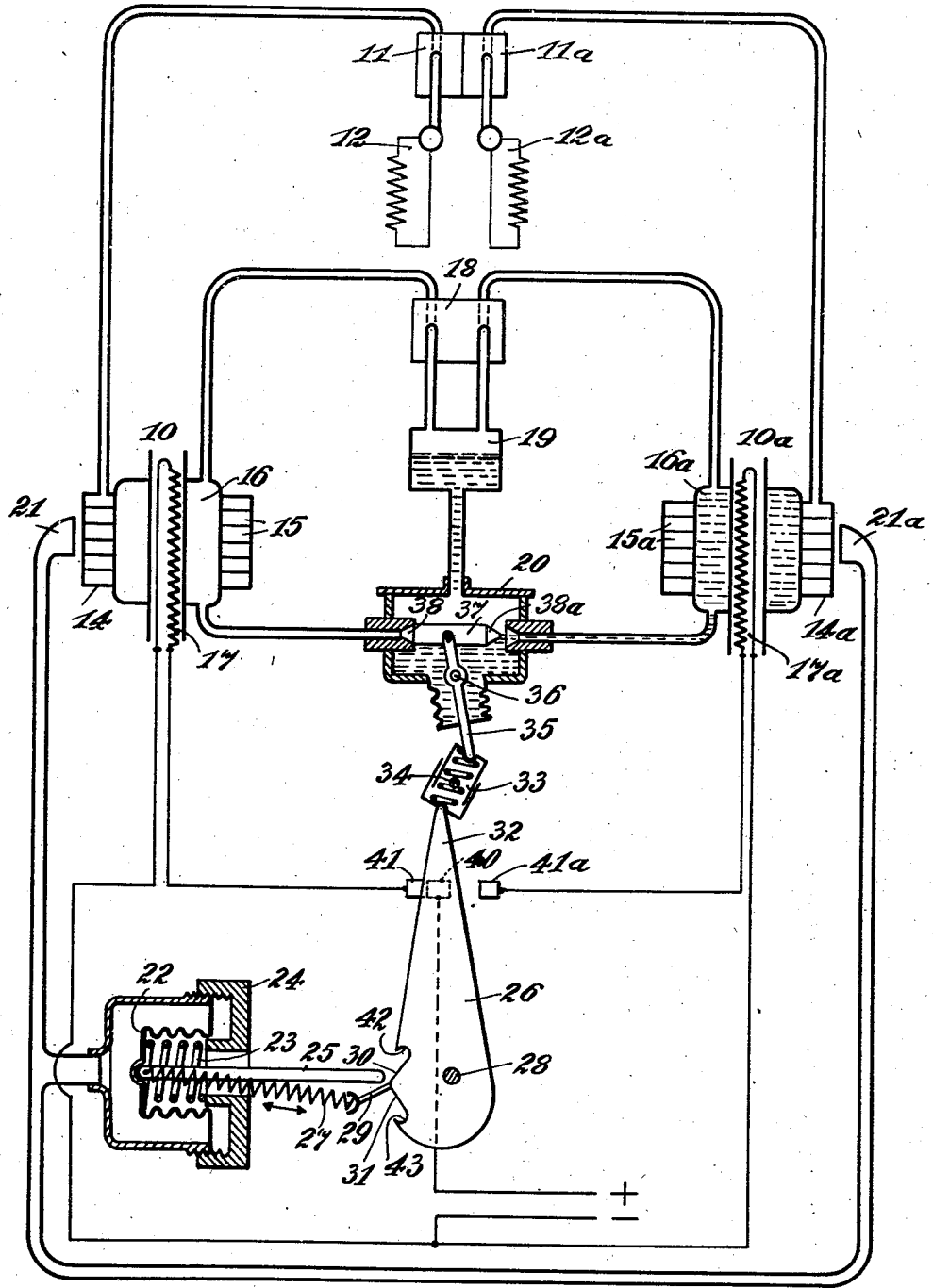

INVENTOR.
Nils Erland af Kleen
BY C. P. Goepel
his ATTORNEY.

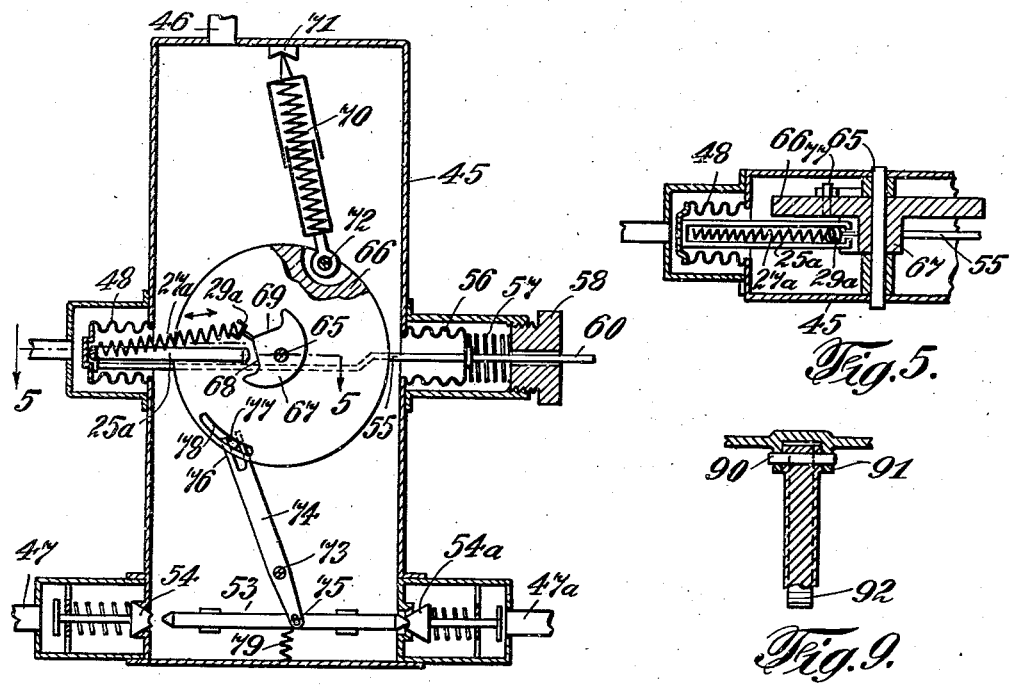

Patented July 18, 1944

2,353,713

UNITED STATES PATENT OFFICE 2,353,713

THERMOSTAT DEVICE FOR ABSORPTION REFRIGERATING APPARATUS

Nils Erland af Kleen, Stockholm, Sweden, assignor to Kleen Refrigerator, Inc., Hoboken, N. J., a corporation of Delaware Application June 29, 1940, Serial No. 343,245
In Sweden February 27, 1940

12 Claims. (Cl. 62—5)

The present invention relates to new and useful improvements in a thermostat device for use in connection with absorption refrigerating apparatus of the type employing at least two units whose boiler absorbers are intermittently and alternately heated (generating period) from an exterior source of heat and afterwards cooled (absorption period). In the following description and claims it is understood that the terms "absorption" and "absorbent" are intended to include both "adsorption" and "adsorbent" respectively.

In the absorption refrigerating systems of this type it is customary to install a device which is operative for the changing over of the units from the absorbing period to the generating period and vice versa, which device is under the control of impulse bodies arranged in the units.

It is the object of the present invention to provide a device of this character which in addition to insuring an instantaneous changing over of the units at the correct moment is much more simple in construction and above all more reliable than those devices heretofore known; furthermore it can be manufactured at an appreciably lower cost.

Another object of the invention is to so arrange the impulse bodies as to affect a common movable member connected with the changing over device, the movement of said member being determined by the condition in the impulse bodies installed in the unit which is at that time in the generating period.

In accordance with this invention, the impulse member may be arranged so as to operate in response to temperature or pressure impulses which originate from the units, for instance the boiler absorbers, the evaporator, or any other parts of the units, and which in the movable member produce movements that are used for the influencing of the changing-over device in the manner set forth above. Usually the impulse bodies consist, in a manner that is in and of itself well known, of pipe-lines which contain a fluid medium, for example a liquid, which is vaporized at the heating of the boiler absorbers during the generating period, and the movable member consists, in a manner that is likewise in and of itself well known, of a bellows or the like that is connected into these pipes-lines. During the heating of the impulse medium the pressure increases in the corresponding pipe-lines and the pressure impulses thus developed cause a linear movement in the bellows for actuating the changing-over device. It is clear that the impulse bodies may also be such that they operate directly in response to the pressure in the units.

The movement in the movable member or bellows may be used in various ways for changing over the units from one period to the other. The changing-over device may, for example, contain a mechanism for the changing of the heat supply from the exterior source of heat, from one boiler absorber to the other, for example, a switch for electric circuits to electric heat cartridges installed in the boiler absorbers, a valve for regulating the supply of liquid or gaseous fuel to corresponding heating means, or of the combustion gases from these, and so forth. On the other hand the changing-over device may be used for changing the supply of a cooling agent from one unit to the other, for example, a valve for regulating the supply of cooling air, cooling water, etc., or a valve for connecting and disconnecting the secondary circuits serving for the cooling of the boiler absorbers, for a condensable and vaporizable secondary refrigerating agent, and so forth. The movement of the movable member or bellows may also be used for regulating the supply both of heat during the generating period and of cooling medium during the absorbing period.

Figure 2:
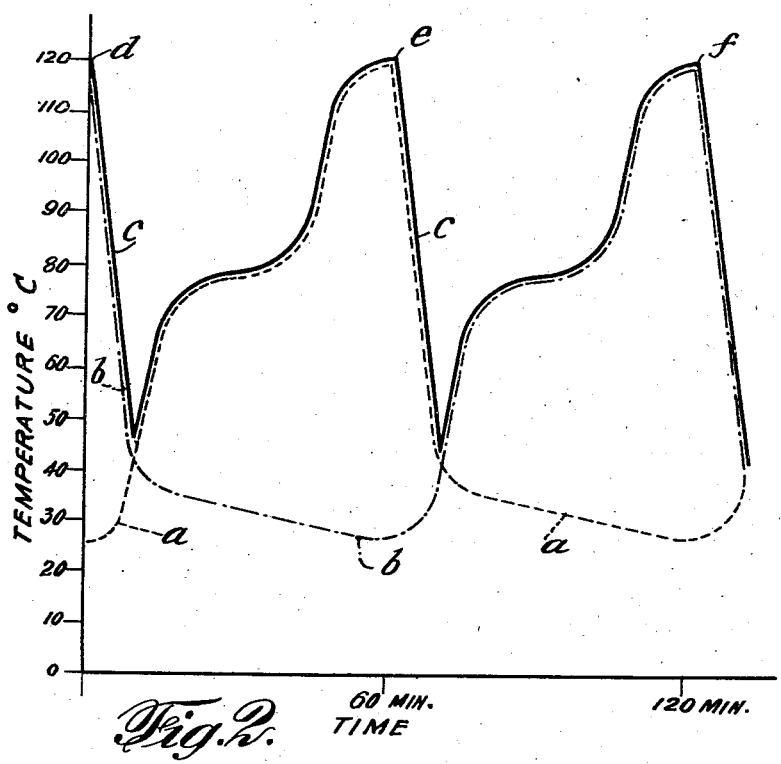
Figure 3:
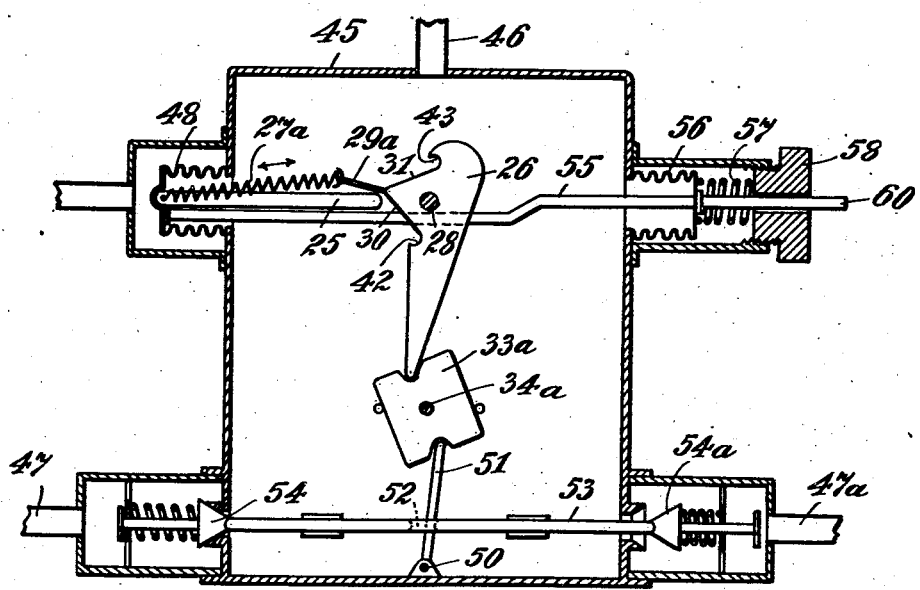

The invention will be described in detail with reference to forms of construction of the same which are shown as examples in the annexed drawings, in which:

Fig. 1 is a diagrammatic view, partly in section, of an absorption refrigerating apparatus consisting of two units, showing one form of thermostat device in accordance with the invention, Fig. 2 is a time-temperature diagram for the boiler absorbers in the two units, Fig. 3 is a horizontal sectional view of a modified form of thermostat device, Fig. 4 is a similar view of another form of thermostat device in accordance with the invention, Fig. 5 is a sectional view taken on line 5—5 of Fig. 4, Fig. 6 is a horizontal sectional view of another modified form of thermostat device with the parts shown in one position, Fig. 7 is a view similar to Fig. 6, but showing the parts in an intermediate or neutral position, Fig. 8 is a similar view showing the parts in a position opposite to that shown in Fig. 6, and Fig. 9 is a sectional view taken on line 9—9 of Fig. 6.

The apparatus shown in Fig. 1 consists of two identical units operating in out of phase relationship to produce continuous cold at a common cold-delivery point, for instance, a refrigerator. Each unit comprises a circulation system (primary circuit) containing the actual refrigerating medium, including a boiler-absorber 10 or 10a, a condenser 11 or 11a, an evaporator 12 or 12a installed in the refrigerator, and the usual connecting pipe-lines. Each boiler absorber consists of a double-walled cylindrical casing 14 or 14a, which contains a number of troughs 15 or 15a arranged axially in succession, which are charged with dry salt, for example strontium chloride, or some other substance capable of absorbing gas and delivering it again upon heating. Within the casings 14 and 14a there is installed a double-walled jacket or pocket 16 and 16a, respectively, within which is an electric heat cartridge 17 or 17a. The inner jackets 16 and 16a, together with a condenser 18, a collecting tank 19, a valve chamber 20, and usual connecting pipe lines, form a closed circulation system for a cooling medium (secondary circuit) to cool the boiler absorbers 10 and 10a.

In thermal contact with the salt in each casing 14 or 14a there is installed an impulse body 21 or 21a, which is filled with some suitable fluid medium influenced by the heating of the boiler absorbers. The increase in pressure which is produced thereby is used in this form of construction to connect and disconnect alternately the heat cartridges 17, 17a and likewise to close and open the secondary circuits alternately by means of mechanism hereinafter described.

The impulse bodies 21, 21a are connected to a common bellows diaphragm contrivance 22, the compression of which under the influence of the increase in pressure is counteracted by a spring 23 whose loading pressure is regulated by means of an adjustment nut 24. The underside of the bellows diaphragm 22 is suitably recessed to form a seat for one end of an operating rod 25 which coacts with a rocking member 26 rotatable on a transverse pin 28 carried on suitable fixed supports (not shown). The rod 25 is retained in its seat by means of a spring 27 secured at one end to the rod 25 adjacent the seat and at its other end to a stub member 29 carried by the rocking member 26. The stub member 29 extends to one side out of the path of movement of rod 25. On each side of the stub 29, the rocking member 26 has a pressure or contact surface 30 and 31, adapted to be alternately engaged by the pressure rod 25, as will later appear. The rocking member 26 has a projecting arm 32 which engages in a snap-spring member 33 which is swingable around the pin 34.

In the said snap-spring member 33 there engages likewise with its one end a two-armed lever 35 which is swingable around a pin 36 that is attached to the valve chamber 20, its other end projecting into the valve chamber and being pivotally connected to a sliding valve rod 37 which terminates at each end preferably in a conical valve 38 and 38a cooperating with respective valve seats for controlling circulation in the secondary circuit.

The electric current to the heat cartridges 17, 17a is controlled by a common contact device, which, as shown in the drawings, consists of a contact piece 40, cooperating with a contact piece 41 or 41a in the circuit of respective cartridges 17 and 17a.

Having described the construction and arrangement of the refrigerating apparatus, its operation is as follows:

In the position shown in Fig. 1, the heat cartridge 17 is current-carrying in the left unit and the valve 38 in this unit is closed, while the heat cartridge 17a in the right unit is not energized and the valve 38a in this unit is open. In other words, the left unit 10 is generating and the other unit 10a is absorbing.

In Fig. 2 there is shown a time-temperature diagram for the two boiler absorbers. The broken-line curve a shows the variation in temperature in the left boiler absorber unit in Fig. 1 during a double cycle (generation plus absorption) and the dot-and-dash curve b indicates the variation in temperature in the other unit during the same double cycle (absorption plus generation). Inasmuch as both the pressure impulse bodies 21, 21a are connected with the same bellows 22, the pressure in the latter thus comes to follow the temperature in accordance with the solid-line curve c, and the change from the absorbing period to the generating period and vice versa comes to take place at the points d, e, and f for the highest temperature.

In conformity therewith the pressure in the bellows 22 first declines until the same temperature prevails in both the boiler absorbers 10 and 10a, whereupon the pressure rises in correspondence with the rise in temperature in the impulse body 21. This results in compressing the bellows 22 and the pressure rod 25 is pushed out to the right in Fig. 1. During the action of the rise in pressure, the pressure rod 25 comes in contact with the pressure surface 30 of the impulse member 26, and when the point e in the diagram is reached and the temperature in the boiler absorber 10 thus attains its highest value, the pressure rod 25 engages with the point 42 of the pressure surface 30. The strength of the spring in the snap-spring member 33 is so adjusted that during the action of the moment exerted by the pressure rod 25, member 33 suddenly shifts over, carrying along the lever 35 and the valve rod 37, which latter opens the valve 38 in the left unit and closes the valve 38a in the other unit. At this change in position the rocking member 26 is turned to a position in which the pressure surface 31 is situated directly in front of the pressure rod 25. At the same time there takes place, also, in any desired manner, a change in position of the switch mechanism 40, 41 to its other terminal position, in which the heat cartridge 17 in the left unit is disconnected and the heat cartridge 17a in the right is connected. The refrigerating apparatus has now been readjusted in such a way that generation commences in the right unit and absorption in the left unit. At the point f of the diagram there takes place a restoration of the mechanisms to the position shown in Fig. 1, as soon as the pressure rod 25 comes into engagement with the point 43 on the pressure surface 31 of rocking member 26.

By changing the loading pressure of the spring 23 by means of the nut 24, it is possible to vary the temperature at which the changing-over takes place. Under certain circumstances it is possible to use the movement at the bellows 22 or some of the members forming part of the changing-over device also for influencing the switch mechanism. It is possible, for instance, to arrange the contact 40 on the rocking member 26 and the other contacts 41, 41a in such a way in relation to the contact 40 that at the changing-over of the rocking member, either circuit is closed and the other one interrupted.

In the form of construction in accordance with Fig. 3 all the changing-over mechanisms are enclosed in a chamber 45 connected into the secondary circuit and 46 designates the pipe-line from the collecting tank 19, and 47, 47a the pipe-lines to the jackets 16, 16a, respectively. Just as before, the pipe-lines from the two impulse members arranged in or at the boiler absorbers open out into a common bellows 48, which here is in open connection with the interior of the chamber 45 and just as in the foregoing form of construction, affects by means of the pressure rod 25, the rocking member 26. In this form of the invention spring 27a secured to stub 29a for maintaining rod 25 in position on its seat in the bellows diaphragm 48, also acts as a snap-spring device for rocking memebr 26. Movement of the rocking member is transmitted to a lever 51 pivoted at 50, by means of an intermediate rocking member 33a pivoted on pin 34a as shown. The lever 51 extends through a central aperture 52 in a valve rod 53 which alternately opens and closes the two valves 54 and 54a, respectively, in the secondary circuit. In order that the movement of the impulse bellows 48 shall not be influenced by the varying pressure in the secondary circuits, the impulse bellows 48 is connected, in this form of construction, by means of a rod 55 with an auxiliary bellows 56, whose expansion is counteracted by a spring 57, the tension of which can be regulated by means of the adjustment nut 58. It is evident that a compression of the impulse bellows 48 brings with it an expansion of the bellows 56, and said bellows 56 can be connected with a rod 60 passing through the nut 58 and whose forward thrusts to the right in the figure can be used for the changing-over of a contact arrangement, for example, a rocking current-breaker (not shown), in the two circuits of the heat cartridges. The operation of this assembly will be evident and it is therefore believed unnecessary to further explain the same.

In the form of construction shown in Fig. 4, all the changing-over mechanism is likewise enclosed in a chamber 45 connected with the secondary circuits as heretofore described in connection with Fig. 3, and parts which have their direct correspondence in Fig. 3 have here the same designations as in that figure. The rocking member has here the form of a disc 66 which is rotatable on a pin 65 and which supports a plate 67 having contact faces 68, 69 which coact with the pressure rod 25a of the impulse bellows 48. In this modification, rod 25a is in the form of a U-shaped member and the stub 29a for spring 27a extends between the two legs of the rod as shown in Fig. 5. A snap-spring contrivance 70 is swingably pivoted at 71 and is movably connected with the disc 66 at 72. The movement of the rocking disc 66 is transmitted to the valve rod 53, which is influenced by a pressure spring 79, by means of a two-armed lever 74 pivoted at 73. One end 75 of the lever 74, is movably connected with the valve rod 53, and its other end 76 is forkshaped to engage with a pin 77 mounted transversely in a slot 78 provided in the disc 66.

In operation, upon movement of the bellows 48 inwardly by an increase in pressure as heretofore described in connection with Fig. 1, the operating rod 25a will engage contact face 68 to rock disc 66 counterclockwise, compressing the snap-spring device 70 until the latter reaches its vertical center position with respect to the pivot 71. During this movement the pin 77 has been free to move in its slot 78 from the position shown in Fig. 4 to the left end of said slot so that the valve operating lever 74 has not been actuated. However, when the snap-spring device has passed its vertical center position, the disc 66 will be quickly rocked in counterclockwise direction by said spring device and the pin 77 having reached the end of its slot 78 will actuate lever 74 to shift to the valve rod 53 to the left, opening valve 54 and closing valve 54a. The spring member 79 secured at one end to the chamber 45 and at its other end to the valve rod 53 serves to maintain the valve rod in its respective extreme positions. On the next operation of the bellows 48, rod 25a will then engage contact face 69 which has been brought into operative position during the counterclockwise rotation of disc 66 above described, and the disc 66 will be rotated in a clockwise direction to reverse the operation of the valve operating lever 74.

While in the foregoing there has been shown and described a single thermostat device operable to selectively actuate a changing-over mechanism first from one extreme operating position to another, the invention also contemplates a thermostat device operable to selectively actuate the changing-over mechanism first from one extreme operating position to an intermediate or neutral position, then to the other extreme operating position for an operation such for example as disclosed in Patent No. 2,276,948 in which it is desired to effect a heat exchange between the boiler-absorber of one intermittent type absorption refrigerating system at the beginning of the absorbing period of said system and the boiler-absorber of another intermittent type absorption refrigerating system operating in out-of-phase relation to the first system. Such a thermostat device is shown in Figs. 6 to 8.

In this form of device the bellows diaphragm arrangement 22a includes a cylindrical member 80 secured to the underside of the bellows diaphragm and movable therewith. The operating rod 25b in this form is pivotally secured by means of pin 90 mounted in supports 91 on the underside of the bellows diaphragm 22a and cooperates with the contact faces 30a and 31a of the changing-over mechanism which in the form illustrated comprises a rocking member 81 rotatable on pin 82. A pair of springs 92 secured to the bellows diaphragm 22a cooperate with each side of the rod 25b to yieldably maintain the latter in vertical position. A pair of abutments 83 and 84 secured to the rocking member 81 adjacent respective contact faces 30a and 31a are adapted to cooperate with the lower end of the cylindrical member 80 during compression of the bellows diaphragm 22a to hold rocking member 81 in an intermediate position.

In operation, referring first to Fig. 6, an increase in pressure on the bellows 22a compresses the latter and moves operating rod 25b against contact face 30a to rock member 81 on its pivot 82 in counterclockwise direction against the tension of snap-spring 85 until the latter gets past its vertical center when said spring acts to further rock the member 81 in the same counterclockwise direction toward its extreme operating position. However, abutment 84 comes into contact with the lower edge of the cylindrical member 80 to arrest rotation of member 81 as shown in Fig. 7, and hold said member at a position intermediate its extreme operating positions until the fluid pressure on the bellows diaphragm 22a drops sufficiently to permit the cylindrical member 80 to be withdrawn out of the path of movement of the abutment 84 during the return movement of the bellows diaphragm and permit the snap spring 85 to rock the member 81 to its extreme operating position shown in Fig. 8. On the next compression of the bellows diaphragm 22a upon increase in fluid pressure, the operating rod 25b will cooperate with contact face 31a to rotate member 81 in a clockwise direction and the lower end of the cylindrical member 80 will cooperate with the abutment 83 to interrupt movement of the rocking member 81 and hold the latter in an intermediate position until the fluid pressure again drops sufficiently to permit member 80 to be withdrawn out of the path of the abutment 83 during the return movement of the bellows diaphragm and permit snap spring 85 to move the member to its other extreme operating position shown in Fig. 6.

From the foregoing it is believed that the construction and advantages of the present invention may be readily understood by those skilled in the art without further description, it being borne in mind that numerous changes may be made in the details disclosed without departing from the spirit of the invention as set forth in the following claims.

What I claim is:

1. In refrigerating apparatus of the intermittent absorption type including two units having alternate generating and absorbing periods and each including combined generating and absorbing means adapted to be heated during the generating periods and cooled during the absorbing periods thereof; the combination of conduit means to flow cooling fluid in heat exchange relation with each of said combined generating and absorbing means, a diaphragm chamber in fluid communication with said conduit means, valve means in said chamber movable to a plurality of operating positions to control the flow of cooling fluid in heat exchange relation with each of said combined generating and absorbing means intermittently and in out of phase relationship with respect to one another, a pressure responsive diaphragm exposed on one side thereof to the fluid in said chamber and movable intermittently from a first position to a second position and cooperating with said valve means to move the latter to each of said operating positions on successive movements from said first position to said second position, a second pressure responsive diaphragm exposed on one side thereof to the fluid in said chamber, means operatively connecting said first-named and second-named diaphragms together for movement as a unit, pressure loading means cooperating with said diaphragm unit to urge the latter in one direction and maintain said first-named diaphragm normally in said first position, and pressure applying means responsive to the temperature in each of said combined generating and absorbing means, cooperating with the other side of one of said diaphragms and operable at a predetermined temperature attained in each of said combined generating and absorbing means intermittently and in out of phase relationship with respect to one another, to move said diaphragm unit intermittently in the opposite direction against said pressure loading means and correspondingly move said first-named diaphragm from said first position to said second position.

2. In refrigerating apparatus of the intermittent absorption type including two units having alternate generating and absorbing periods and each including combined generating and absorbing means adapted to be heated during the generating periods and cooled during the absorbing periods thereof; the combination of conduit means to flow cooling fluid in heat exchange relation with each of said combined generating and absorbing means, a diaphragm chamber in fluid communication with said conduit means, valve means in said chamber movable to a plurality of operating positions to control the flow of cooling fluid in heat exchange relation with each of said combined generating and absorbing means intermittently and in out of phase relationship with respect to one another, a pressure responsive diaphragm exposed on one side thereof to the fluid in said chamber and movable intermittently from a first position to a second position and cooperating with said valve means to move the latter to each of said operating positions on successive movements from said first position to said second position, a second pressure responsive diaphragm exposed on one side thereof to the fluid in said chamber, means operatively connecting said first-named and second-named diaphragms together for movement as a unit, pressure loading means cooperating with said diaphragm unit to urge the latter in one direction and maintain said first-named diaphragm normally in said first position, pressure applying means responsive to the temperature in each of said combined generating and absorbing means, cooperating with the other side of one of said diaphragms and operable at a predetermined temperature attained in each of said combined generating and absorbing means intermittently and in out of phase relationship with respect to one another, to move said diaphragm unit intermittently in the opposite direction against said pressure loading means and correspondingly move said first-named diaphragm from said first position to said second position, and means for adjusting the loading pressure of said pressure loading means.

3. In refrigerating apparatus of the intermittent absorption type including two units having alternate generating and absorbing periods and means for controlling the operation from generating to absorbing and vice versa of each of said units in out of phase relationship with respect to one another; a device for actuating said control means, comprising a rocking member movable between two operating positions, a pair of diverging contact faces carried by said member, a reciprocatable plunger adapted to cooperate first with one of said contact faces and then with the other of said contact faces on successive reciprocations to move said rocking member from one operating position to the other and vice versa, a single thermostat acted upon by changes in temperature in both of said units and operable at a predetermined temperature attained in each of said units intermittently and in out of phase relationship with respect to one another to move said plunger in one direction for engagement with either of said contact faces, pressure loading means for urging said plunger and thermostat in the opposite direction out of engagement with either of said contact faces, and resilient means for yieldably maintaining said rocking member in either of its operating positions.

4. In refrigerating apparatus of the intermittent absorption type including two units having alternate generating and absorbing periods and means for controlling the operation from generating to absorbing and vice versa of each of said units in out of phase relationship with respect to one another; a device for actuating said control means comprising a rocking member movable between two operating positions, a pair of diverging contact faces carried by said member, a reciprocatable plunger adapted to cooperate first with one of said contact faces and then with the other of said contact faces on successive reciprocations to move said rocking member from one operating position to the other and vice versa, a single thermostat acted upon by changes in temperature in each of said units and operable at a predetermined maximum temperature attained in each of said units intermittently and in out of phase relationship with respect to one another to move said plunger in one direction for engagement with either of said contact faces, pressure loading means for urging said plunger and thermostat means in the opposite direction out of engagement with either of said contact faces, means carried by said thermostat and cooperating with said rocking member to interrupt movement of the latter by said plunger and hold said rocking member in a position intermediate said operating positions, said last-named means operative to release said rocking member at a predetermined temperature lower than said predetermined maximum temperature and attained in each of said units intermittently and in out of phase relation to said predetermined maximum temperature, and spring means for yieldably maintaining said rocking member in either of its operating positions.

5. In refrigerating apparatus of the intermittent absorption type including two units having alternate generating and absorbing periods; the combination with control mechanism including means movable from one extreme operating position to another and vice versa to control the operation from generating to absorbing and vice versa of each of said units in out of phase relationship with respect to one another; of means acted upon by changes in conditions in each of said units including an element movable intermittently from a first position to a second position at a predetermined condition attained in each of said units intermittently and in out of phase relationship with respect to one another to move the movable means of said control mechanism from one of said extreme operating positions to the other and vice versa on successive movements from said first position to said second position, and other means cooperating with said movable means during each movement of said element from said first position to said second position to interrupt movement of said movable means and hold the latter at a position intermediate said extreme operating positions, said last named means being operative to release said movable means at a predetermined condition different from said first named predetermined condition.

6. In refrigerating apparatus of the intermittent absorption type including two units having alternate generating and absorbing periods; a thermostat device for automatically controlling the operation from generating to absorbing and vice versa of each of said units in out of phase relationship with respect to one another comprising control means movable from one extreme operating position to another and vice versa, actuating means movable intermittently from a first position to a second position to move said control means from one extreme operating position to the other and vice versa on successive movements from said first position to said second position, means acted upon by changes in temperature in each of said units to move said actuating means intermittently from said first position to said second position at a predetermined temperature attained in each of said units intermittently and in out of phase relationship with respect to one another, and means acted upon by changes in conditions in each of said units cooperating with said control means during each movement of said actuating means from said first position to said second position to interrupt movement of said control means and hold the latter at a position intermediate said extreme operating positions, said last named means being operative to release said control means at another predetermined temperature attained in each of said units intermittently and in out of phase relation to said first named predetermined temperature.

7. In refrigerating apparatus of the intermittent absorption type including two units having alternate generating and absorbing periods and each including a boiler-absorber adapted to be heated during the generating periods thereof; the combination of heating means for said boiler-absorbers, and thermostat mechanism for automatically controlling the operation from generating to absorbing and vice versa of each of said units in out of phase relationship with respect to one another including control means cooperating with said heating means and movable from one extreme operating position to another and vice versa to control the heat supply to each of said boiler-absorbers intermittently and in out of phase relationship with respect to one another, spring means normally maintaining said control means in either of said extreme operating positions, actuating means movable intermittently from a first position to a second position to move said control means from one extreme operating position to the other and vice versa on successive movements from said first position to said second position, means responsive to the temperature in each of said boiler-absorbers and operative at a predetermined maximum temperature attained during the generating period of the respective unit to move said actuating means intermittently from said first position to said second position, and means actuated by said temperature responsive means cooperating with said control means during each movement of said actuating means from said first position to said second position to interrupt movement of said control means and hold the latter at a position intermediate said extreme operating positions, said last named means being operable to release said control means at a predetermined temperature lower than said predetermined maximum temperature and attained in each of said boiler-absorbers intermittently and in out of phase relation to said predetermined maximum temperature.

8. In refrigerating apparatus of the intermittent absorption type including two units having alternate generating and absorbing periods and each including a boiler-absorber adapted to be heated during the generating periods thereof; the combination with heating means for said boiler-absorbers, and control mechanism including means movable from one extreme operating position to another and vice versa to control the heat supply to each of said boiler-absorbers intermittently and in out of phase relationship with respect to one another; of pressure responsive means movable intermittently from a first position to a second position to move said movable means of the control mechanism from one of said extreme operating positions to the other and vice versa on successive movements from said first position to said second position, pressure applying means acted upon by changes in temperature in each of said boiler-absorbers and operating at a predetermined temperature attained during one of the operating periods of each of said units to move said pressure responsive means intermittently from said first position to said second position, and other means acted upon by changes in temperature in each of said boiler-absorbers and cooperating with said movable means during each movement of said pressure responsive means from said first position to said second position to interrupt movement of said movable means and hold the latter at a position intermediate said extreme operating position, said last named means operating to release said movable means at another predetermined temperature attained in each of said boiler-absorbers during the other one of the operating periods of each of said units.

9. In refrigerating apparatus of the intermittent absorption type including two units having alternate operating and absorbing periods; the combination of control mechanism including an element movable from one extreme operating position to another and vice versa to control the operation from generating to absorbing and vice versa of each of said units in out of phase relationship with respect to one another, a pair of diverging contact faces on said movable element, pressure responsive means movable intermittently from a first position to a second position and adapted to cooperate first with one and then with the other of said contact faces on successive movements from said first position to said second position to move said movable element from one of said extreme operating positions to the other and vice versa, pressure loading means normally maintaining said pressure responsive means in said first position, and a plurality of pressure creating members including one acted upon by changes in temperature in one of said units and another acted upon by changes in temperature in the other one of said units and each operating at a predetermined temperature attained during the generating periods of the respective unit to move said pressure responsive means intermittently from said first position to said second position against the loading pressure of said pressure loading means.

10. In a refrigerating apparatus of the intermittent absorption type including two units having alternate generating and absorbing periods; the combination of control mechanism including a rocking member movable from one extreme operating position to another and vice versa to control the operation from generating to absorbing and vice versa of each of said units in out of phase relationship with respect to one another, a pair of diverging contact faces on said rocking member, a pressure responsive diaphragm assembly including a plunger movable intermittently from a first position to a second position and adapted to cooperate first with one and then with the other of said contact faces on successive movements from said first position to said second position to move said rocking member from one of said extreme operating positions to the other and vice versa, pressure loading means normally maintaining said diaphragm assembly in said first position, and a plurality of pressure creating members including one acted upon by changes in temperature in one of said units and another acted upon by changes in temperature in the other one of said units and each operating at a predetermined temperature attained during one of the operating periods of the respective unit to move said diaphragm assembly intermittently from said first position to said second position against the loading pressure of said pressure loading means.

11. In a refrigerating apparatus of the intermittent absorption type including two units having alternate generating and absorbing periods; the combination of means including a rocking member movable from one extreme operating position to another and vice versa to control the operation from generating to absorbing and vice versa of each of said units in out of phase relationship with respect to one another, a pair of diverging contacting faces on said rocking member, a pressure responsive diaphragm assembly including a plunger movable intermittently from a first position to a second position and adapted to cooperate first with one and then with the other of said contact faces on successive movements from said first position to said second position to move said rocking member from one of said extreme operating positions to the other and vice versa, pressure loading means normally maintaining said diaphragm assembly in said first position, a plurality of pressure creating members including one acted upon by changes in temperature in one of said units and another acted upon by changes in temperature in the other one of said units and each operating at a predetermined temperature attained during one of the operating periods of the respective unit to move said diaphragm assembly intermittently from said first position to said second position against the loading pressure of said pressure loading means, and means for varying the loading pressure of said loading pressure means to vary correspondingly the operating temperature of said pressure creating members.

12. In refrigerating apparatus of the intermittent absorption type including two units having alternate generating and absorbing periods and each including a boiler-absorber adapted to be heated during the generating periods thereof; the combination of heating means for said boiler-absorbers, a rocking member cooperating with said heating means and movable from one extreme operating position to another and vice versa to control the heat supply to each of said boiler-absorbers intermittently and in out of phase relationship with respect to one another, a pair of diverging contact faces on said rocking member, pressure responsive means movable intermittently from a first position to a second position and adapted to cooperate first with one and then with the other of said contact faces on successive movements from said first position to said second position to move said rocking member from one of said extreme operating positions to the other and vice versa, pressure loading means normally maintaining said pressure responsive means in said first position, and a plurality of pressure creating elements including one acted upon by changes in temperature in one of said boiler-absorbers and another acted upon by changes in temperature in the other one of said boiler-absorbers and each operating at a predetermined temperature attained during the generating periods of the respective unit to move said pressure responsive means intermittently from said first position to said second position against the loading pressure of said pressure loading means.

NILS ERLAND AF KLEEN.